(12) United States Patent  (10) Patent No.: US 8,125,293 B2
Sakai et al.  (45) Date of Patent: Feb. 28, 2012

(54) COMMUNICATION SYSTEM USING DIFFERENTIAL TWO-WIRE TYPE OF COMMUNICATION LINE

(75) Inventors: Naoto Sakai, Takahama (JP); Koji Kondo, Tokoname (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1216 days.

(21) Appl. No.: 11/882,289

(22) Filed: Jul. 31, 2007

(65) Prior Publication Data

US 2008/0049849 A1    Feb. 28, 2008

(30) Foreign Application Priority Data

Jul. 31, 2006  (JP) ................................. 2006-208454

(51) Int. Cl.
*H01P 5/12* (2006.01)
(52) U.S. Cl. .......................... 333/125; 333/134; 333/136
(58) Field of Classification Search .......... 333/124–129, 333/134, 136
See application file for complete search history.

(56) References Cited

U.S. PATENT DOCUMENTS

| | | | |
|---|---|---|---|
| 4,388,725 A | 6/1983 | Saito et al. | |
| 5,142,526 A | 8/1992 | Moriue et al. | |
| 5,465,255 A | 11/1995 | Tanaka et al. | |
| 5,548,226 A | 8/1996 | Takekuma et al. | |
| 5,568,063 A | 10/1996 | Takekuma et al. | |
| 5,627,481 A | 5/1997 | Takekuma et al. | |
| 5,668,834 A | 9/1997 | Takekuma et al. | |
| 5,767,695 A | 6/1998 | Takekuma et al. | |
| 5,818,253 A | 10/1998 | Takekuma et al. | |
| 6,172,517 B1 | 1/2001 | Takekuma et al. | |
| 6,420,900 B2 | 7/2002 | Takekuma et al. | |
| 6,441,639 B1 | 8/2002 | Takekuma et al. | |
| 6,873,179 B2 | 3/2005 | Takekuma et al. | |
| 7,015,717 B2 | 3/2006 | Takekuma et al. | |
| 7,123,048 B2 | 10/2006 | Takekuma et al. | |

(Continued)

FOREIGN PATENT DOCUMENTS

JP    54-119805    9/1979

(Continued)

OTHER PUBLICATIONS

Japanese Office Action dated Aug. 24, 2010 issued in corresponding Japanese Application No. 2008-208454 with English Translation.

(Continued)

*Primary Examiner* — Robert Pascal
*Assistant Examiner* — Kimberly Glenn
(74) *Attorney, Agent, or Firm* — Nixon & Vanderhye PC

(57) ABSTRACT

A communication system includes a network, plural nodes, and a reducer. The network includes a main line and a plurality of branch lines branched from the main line respectively, the main line and each of the branch lines being respectively formed into a differential two-wire type of communication line consisting of a first communication line and a second communication line. The plural nodes are connected to two or more branch lines of the plurality of branch lines to communicate frames of data among the branches with each other. The reducer is connected to each node to reduce either an impedance of each of the first and second communication lines or an impedance between the first and second communication lines during a specified period of time starting at a time instant when a node completes sending out frames of data to be transmitted.

18 Claims, 14 Drawing Sheets

U.S. PATENT DOCUMENTS

| | | |
|---|---|---|
| 2002/0175701 A1 | 11/2002 | Takekuma et al. |
| 2005/0200380 A1 | 9/2005 | Rapport |
| 2005/0208902 A1 | 9/2005 | Yagyu et al. |
| 2007/0018683 A1 | 1/2007 | Takekuma et al. |
| 2008/0123771 A1* | 5/2008 | Cranford et al. ............... 375/285 |

FOREIGN PATENT DOCUMENTS

| | | |
|---|---|---|
| JP | S54-119805 | 9/1979 |
| JP | 61-108243 | 5/1986 |
| JP | 64-1986 | 1/1989 |
| JP | 1-256250 | 10/1989 |
| JP | 05-300155 | 11/1993 |
| JP | H05-300155 | 11/1993 |
| JP | 09-238164 | 9/1997 |
| JP | H09-238164 | 9/1997 |
| JP | 2001-045071 | 2/2001 |
| JP | 2003-244172 | 8/2003 |
| JP | 2005-269336 | 9/2005 |

OTHER PUBLICATIONS

German Office Action dated Feb. 26, 2009, issued in counterpart German Application No. 10 2007 036 077.2-31, with English Translation.

* cited by examiner ically concerned about in large-size networks, because there are a large number of branches in such networks and reflected waves occurring on the communication lines are more severe.

COMMUNICATION SYSTEM USING DIFFERENTIAL TWO-WIRE TYPE OF COMMUNICATION LINE

CROSS REFERENCES TO RELATED APPLICATION

The present application relates to and incorporates by reference Japanese Patent application No. 2006-208454 filed on Jul. 31, 2006.

BACKGROUND OF THE INVENTION

1. Field of the Invention

The present invention relates to a communication system, and in particular, to a communication system which uses a differential two-wire type of communication line serving as a communication line composing a network.

2. Description of the Related Art

Recent vehicles are provided with in-vehicle communication systems with which a variety of in-vehicle devices are controlled. In such in-house communication systems, a communication system using a differential two-wire type of communication line is familiar, which composes a network in the vehicle.

This type of communication system adopts a network provided with a communication line generally consisting of a main line serving as a main transmission path and a plurality of branch lines branched from the main line. A node is connected to each branch line. Both ends of the main line are terminated by termination circuits.

In cases where branch lines are equipped in the communication system, a mismatch between characteristic impedances on the communication lines will cause reflection of electromagnetic waves. Such a mismatch exists at a branch point from which each branch line is branched from the main line (that is, each branch point is a connection point of both each branch line and the main line). The reflected waves will distort signal waves of frames of data to be transmitted. Depending on how much the distortion occurs, signal reception may result in failure. That is, an addressed node may receive erroneous data.

In consideration of such circumstances, Japanese Patent Laid-open Publication No. 9-238164 discloses a technique for suppressing reflected waves from occurring in each branch line. Practically, a resistor and a capacitance, both for matching impedances, are interposed between the main transmission path and each branch wiring, in which the resistor and capacitance are made to partly be valid during transmission of frame data and made to be invalid after the transmission of the frame data.

However, although the suppression technique disclosed by the above reference is helpful for suppressing the occurrence itself of reflected waves, it has no capability of dismissing the once-occurring reflected waves. in other words, by this suppression technique, electromagnetic waves through the transmission lines can be suppressed from being reflected during the transmission of frame data, but it is not effective for reducing the reflected waves occurring immediately after completion of the sending-out operation for frame data.

In the case of the above-described conventional technique, it is difficult to sufficiently avoid the erroneous data reception. In contrast, it is required to limit the degree of freedom for designing the lengths of communication lines and the topology, if the impedance matching is made to focus a state where the communication lines are not subjected to the transmission of frame data. These mutual-conflicting difficulties are espe-

SUMMARY

The present exemplary embodiment has been completed with the above view in mind and an object of the present exemplary embodiment is to provide a communication system with a differential two-wire type of communication line in which reflected waves, which are caused when a node completes its sending-out operation for frames of data to a branch line, are sufficiently suppressed.

In order to achieve the object, as one aspect, the present invention provides a communication system comprising the network, a plurality of nodes, and a reducer. The network comprises a main line and a plurality of branch lines branched from the main line respectively, the main line and each of the branch lines being respectively formed into a differential two-wire type of communication line consisting of a first communication line and a second communication line. The plurality of nodes are connected to the branch lines to communicate frames of data among the branches with each other. The reducer is arranged to at least one of the nodes to reduce either an impedance of each of the first and second communication lines or an impedance between the first and second communication lines during a specified period of time starting at a time instant when, of the plurality of nodes, a node completes sending out the frames of data to be transmitted, the first and second communication lines subjected to the reduction in the impedance composing, of the plurality of branch lines, a branch line connected to the node which sends out the frames of data.

Another aspect, the present exemplary embodiment provides a node for a network comprising a main line and a plurality of branch lines branched from the main line respectively, the main line and each of the branch lines being respectively formed into a differential two-wire type of communication line consisting of a first communication line and a second communication line. The node is connected with each of at least two of the branch lines. The node comprises a circuit to communicate frames of data between the branches with each other and a reducer. The reducer reduces either an impedance of each of the first and second communication lines or an impedance between the first and second communication lines during a specified period of time starting at a time instant when the circuit completes sending out the frames of data to be transmitted, the first and second communication lines subjected to the reduction in the impedance composing the branch line connected to the node which sends out the frames of data.

According to the communication system and the node described above, on completion of the sending-out operation of frames of data, the impedance of the first and second communication lines or the impedance between the first and second communication lines are reduced during the specified period of time. Thus reflected waves caused on the communication lines due to a mismatch in the characteristic impedance of the communication lines can be absorbed by (or collided with) the reduced impedance, thus being sufficiently suppressed. Accordingly erroneous data reception by other nodes, which is caused immediately after sending out the frames of data, can be avoided.

DETAILED DESCRIPTION OF PREFERRED EMBODIMENTS

Various embodiments of a communication system according to the present invention will now be described with reference to the accompanying drawings.

First Embodiment

Referring to FIGS. 1-4, a first embodiment of the communication system according to the present invention will now be detailed.

In the first embodiment, by way of example, an in-vehicle communication system mounted in a vehicle is reduced into practice as the communication system of the present exemplary embodiment.

Figure 1:
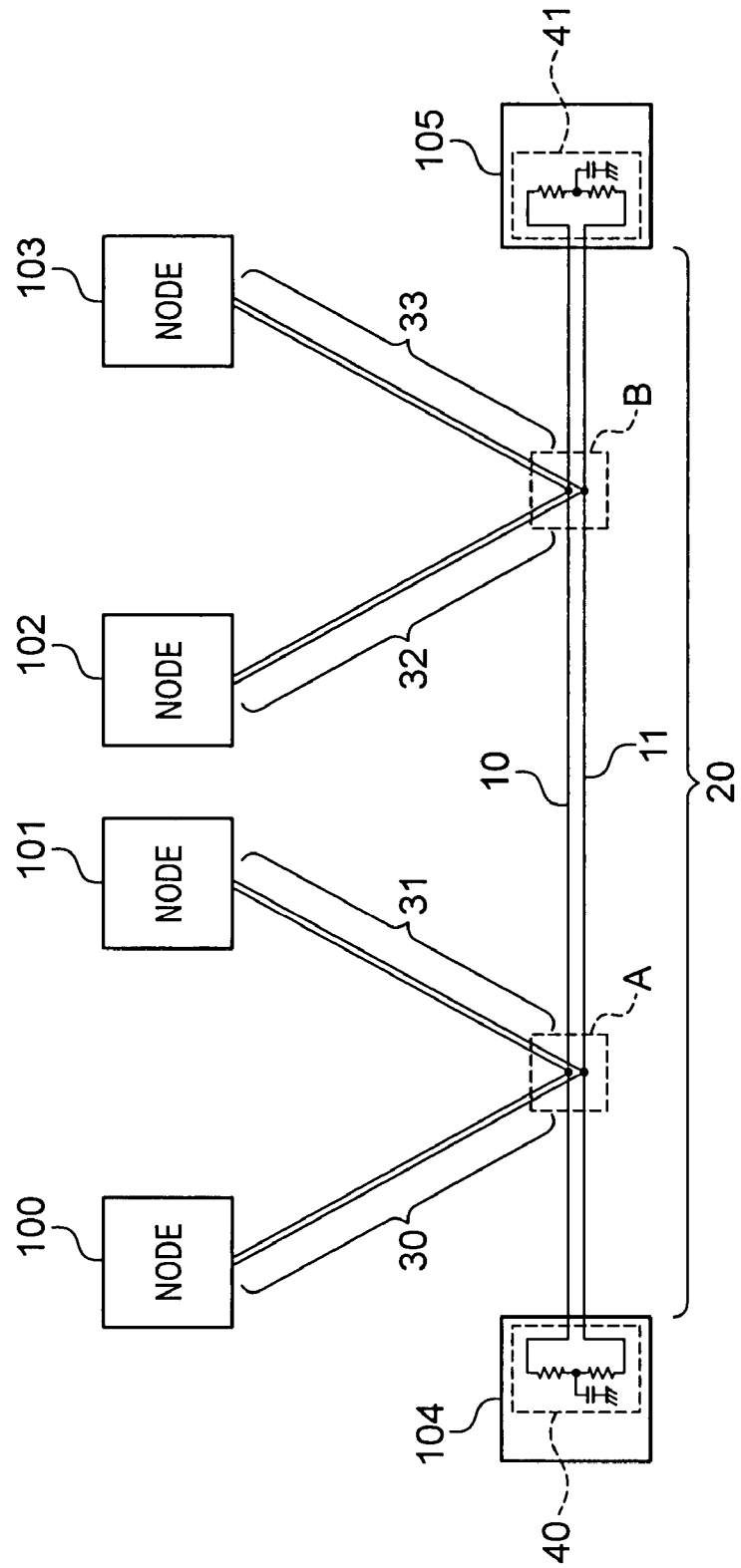
FIG. 1 is a system diagram exemplifying a communication system according to embodiments of the present invention.

As shown in FIG. 1, the communication system comprises, as the communication line, a main line 20 and a plurality of branch lines 30-33 communicably connected to the main line 20, respectively. The main line 20 and each of the branch lines 30-33 are composed of a first communication line 10 and a second communication line 11. In this exemplified communication system, there is provided a branch point "A" in the main line 20, from which two of the branch lines, 30 and 31, are branched respectively. Meanwhile, the main line 20 is equipped with a second branch point "B" therein, from which two of the branch lines, 32 and 33, are branched respectively.

The end of each of the branch lines 30-33, which is opposite to the branch points "A" or "B," is connected to a node 100 (to 103). In addition, nodes 104 and 105 are connected to both ends of the main line 20, respectively. In each of the nodes 104 and 105, there are provided termination circuits 40 and 41 for the line 20, so that the nodes 104 and 105 are produced as nodes with termination circuits.

On the other hand, the nodes 100-105 are electronic control units (ECUs) mounted in the vehicle and are in charge of controlling various in-vehicle electronic devices through mutual communication of bits of information there among.

Figure 2:
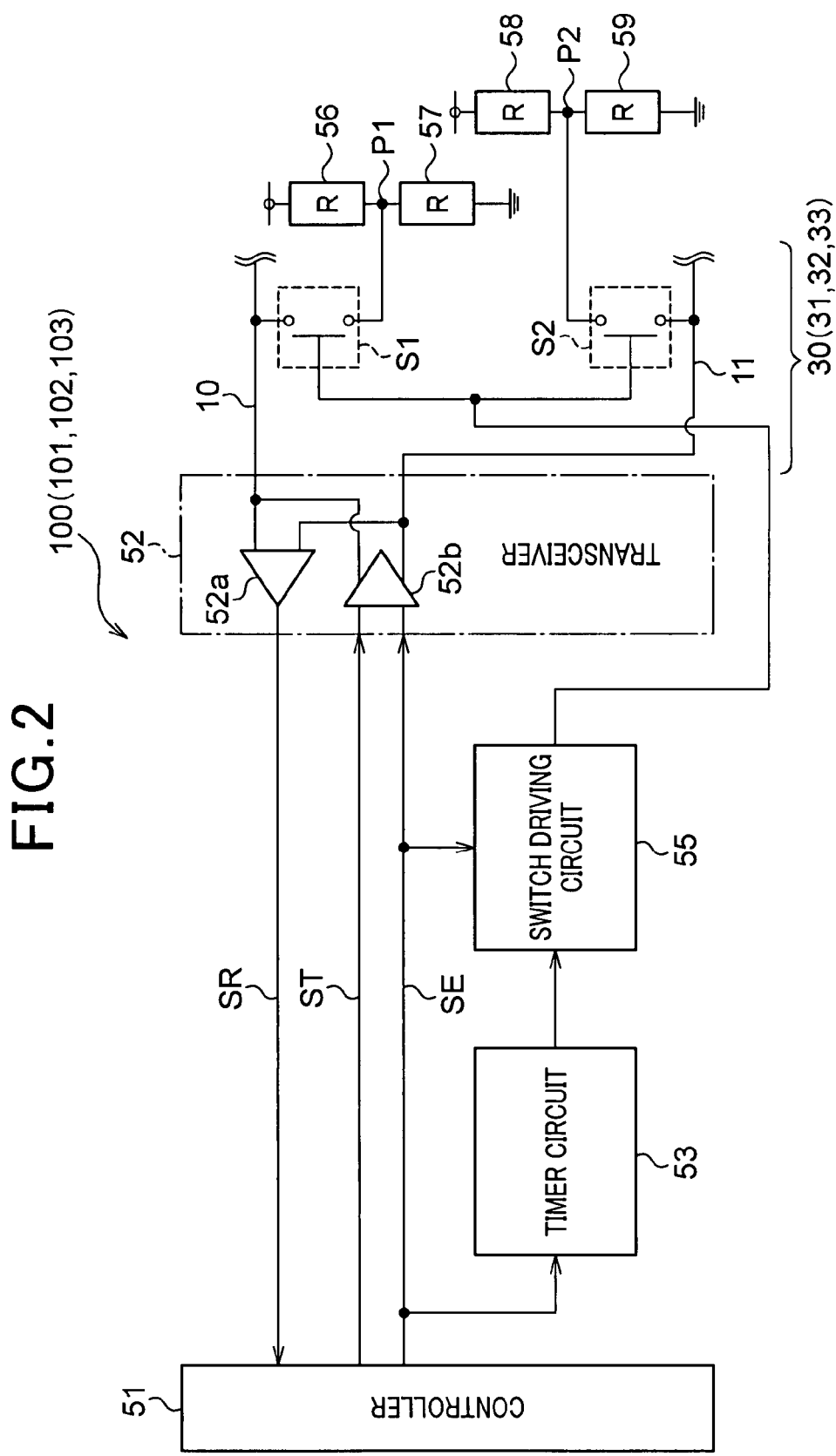
FIG. 2 is a configuration diagram, partly in blocks, showing communication-related components incorporated in one of nodes connected to the communication system according to the first embodiment.

With reference to FIG. 2, the nodes 100-103 will now be detailed. FIG. 2 shows, as a representative, only a communication-related part of one of the nodes, 100, but the other nodes 101-103 are the same as that of the node 100.

As shown in FIG. 2, each of the nodes 100-103 is provided with a controller 51 and a transceiver 52, which are hardware related to the communication. Of these, the transceiver 52 is provided with a reception circuit 52a formed to have signals on the communication lines inputted to the controller 51 and a transmission circuit 52b formed to send out signals (frames of data) onto the communication lines.

Figure 3:
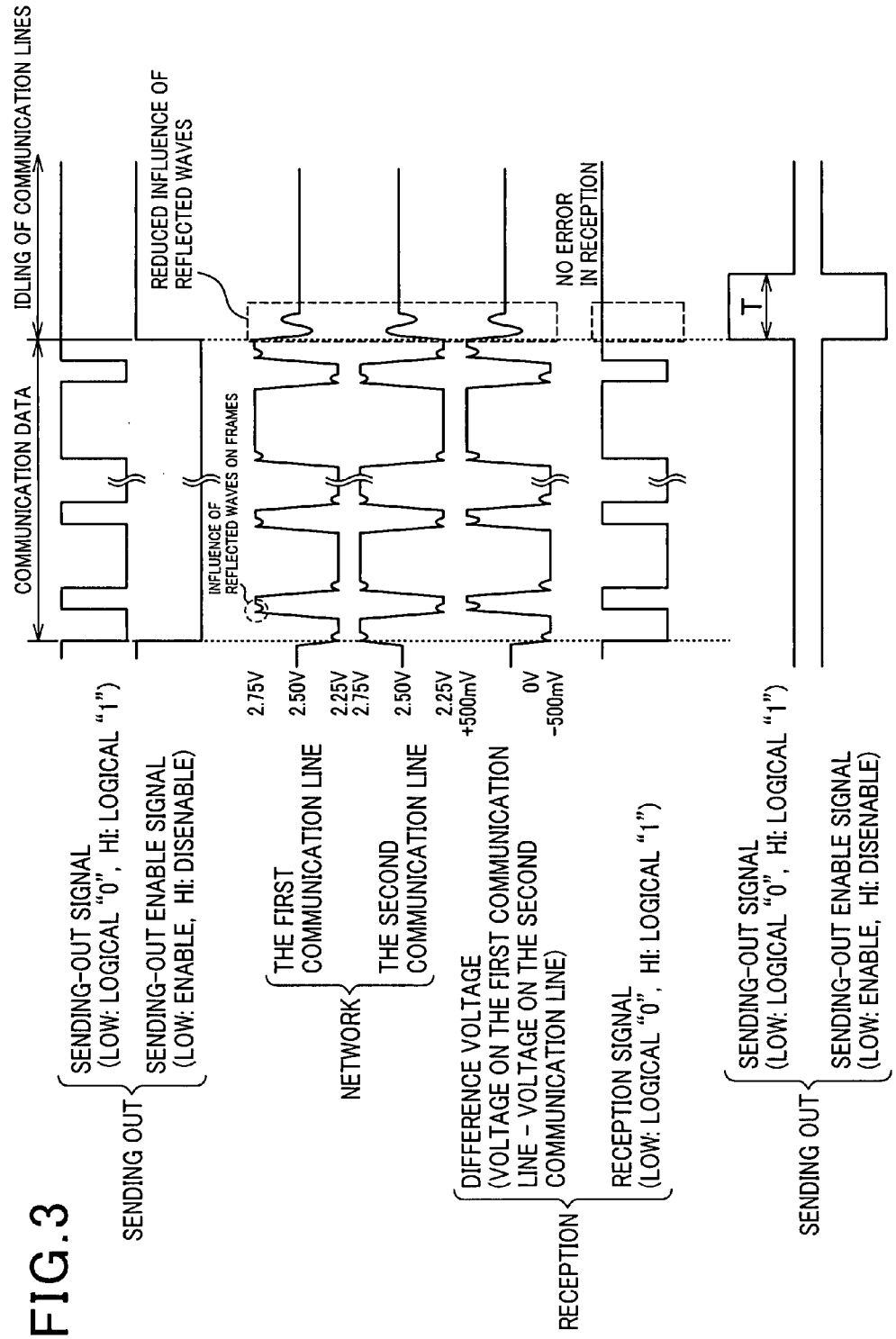
FIG. 3 is a timing chart showing operations and advantages performed and gained in the communication system according to the first embodiment.

To be specific, the transmission circuit 52b operates as explained in the first to fourth columns in FIG. 3. That is, when a sending-out enable signal SE coming from the controller 51 is at an active level low (LOW) level in the present embodiment), sending out signals is allowed. In this allowed state, when a sending-out signal ST (i.e., signals to be sent out) is inputted from the controller 51 to the transmission circuit 52b, the voltages (potentials) on the first and second communication lines 10 and 11 are changed depending on the sending-out signal ST. The changes in the voltages results in sending out the sending-out signal ST on the communication lines.

Specifically, when the sending-out signal ST is in the HI (High) level, the voltage on the first communication line 10 is changed up to 2.75 V higher than 2.5 V (voltage on the idling communication lines) by 0.25 V, while the voltage on the second communication line 11 is changed down to 2.25 V lower than 2.5 V by 0.25 V. In contrast, when the sending-out signal ST is in the LOW (Low) level, the first communication line 10 is changed down to 2.25 V, while the second communication line 11 is changed up to 2.75 V. The voltage of 2.5 V is set when the communication lines are idling. The idling state is referred to as a state where frames of data are not sent out on the communication lines (i.e., transmission-rest state).

In addition, when the sending-out enable signal SE is in the High level (no signal sending-out action is performed), the output of the transmission circuit 52b is brought into a high impedance state. In response to this high impedance state, the voltages (potentials) on the first and second communication cables 10 and 11, which are in the idling state, are set to 2.5 V.

On the other hand, the reception circuit 52a is formed to operate as explained in the fifth and sixth columns in FIG. 3. Specifically, the reception circuit 52a receives the voltages on the first and second communication lines 10 and 11, and subtract the voltage on the second communication line 11 from that on the first communication line 10 to produce a difference voltage. In the circuit 52a, the produced difference voltage is compared to a predetermined threshold so that a reception signal SR is formed to be High (Hi) or Low (LOW) level, and the reception signal SR is provided to the controller 51. The controller 51 receives the reception signal SR from the transceiver 52 for interpretation.

As shown in FIG. 2, the node 100 is provided with a controller 51, a transceiver 52, two serially-connected sets of resistors 56 and 57, and 58 and 59, switches S1 and S2, a timer circuit 53, and a switch driving circuit 55. Of these components, one set of serially connected resistors 56 and 57 is arranged to divide a given voltage (e.g., 5 V), and the other set of serially connected resistors 58 and 59 are also arranged in the same way as the set of resistors 56 and 57. The switch S1, which is produced as an electronic on/off switch, makes the first communication line 10 connect to a connection point P1 connecting the resistors 56 and 57, when the switch S1 is turned into its on state. The switch S2, which is also produced as an electronic on/off switch, makes the second communication line 11 connect to a connection point P2 connecting the resistors 58 and 59, when the switch S1 is turned into its on state.

In FIG. 2, the first and second communication lines 10 and 11 are shown as the two communication lines that compose two wires passing through the branch line 30 connected to the node 100.

The resistances of the resistors 56 and 57 are set to the same values such that the potential at the connection point P1 between both resistors 56 and 57 is made to agree with a potential given when the first and second communication lines 10 and 11 are in their idling states, respectively. In this example, such a potential is 2.5 V, and this potential is defined as a "frame-non-output potential". Like this, the resistors 58 and 59 are selected to have the same resistances, so that the potential at the connection point P2 between both resistors 58 and 59 realizes the "frame non-output potential." In addition to the above considerations, the resistances of the resistors 56-59 are set to values which are sufficiently smaller than an impedance given between each of the communication lines 10, 11 and each of the power source and the ground in a case where a transmission circuit of the transceiver 52 is not in signal transmission operation (i.e., a sending-out enable signal SE is high (Hi): refer to FIG. 3).

The timer circuit 53 is formed to operate as shown in the second and seventh columns in FIG. 3. Practically, at a time when the sending-out enable signal SE, which comes from the controller 51 to the transceiver 52, changes from its low level to its high level (i.e., at a time when the transmission circuit 52b of the transceiver 52 has completed its transmission of a frame to the branch line 30, the timer circuit 53 starts procuring a high (Hi) output for only a predetermined period of time T counted from the changes in the level.

The switch driving circuit 55 is formed to operate responsively to the output from the timer circuit 53 and the sending-out enable signal SE, as shown in the second, seventh, and eighth columns in FIG. 3. Concretely the switch driving circuit 55 turns on the foregoing switches S1 and S2 during only the predetermined period of time T counted from the transition of the sending-out enable signal SE to its High to a time when the timer circuit 53 returns its output to its low level.

The operations of a node 100, which is to send out frames (data to be communicated), will now be detailed. Of course, the other nodes 101-103 act in the same way.

First, reflected waves occurring during the sending-out operation for frames from the node 100 will now be described.

In cases where a communication line has a part at which its characteristic impedance is not even (mismatched), frames sent out from a node will cause reflection. For example, like the branch point A in the communication lines shown in FIG. 1, a boundary at which the characteristic impedance changes will cause not only part of coming frames to be reflected there but also the remaining to be transmitted therethrough.

During the sending-out operation for the frames, reflected waves will return to the node after a time delayed by transmission (for example, in the case of a copper wire, approx. 5 ns/m). The reflected waves are caused on the known theory for voltage reflection efficiency. The returned reflected waves are superposed on frames which are now under the sending-out operation, bringing about distortions in the waves of frames which are now being sent out. However, during sending-out the frames, the transmission circuit 52b is able to output larger amounts of driving power which cancels part the reflected waves, so that amounts of reflected waves which are superposed on the frames to be transmitted are not so greater. In other words, amounts of distortion of the frames to be transmitted are not so greater.

Accordingly, during the sending-out operation for the frames, it is possible for reception nodes to avoid reception of largely distorted frames resulting in erroneous interpretation of data, provided that the communication system is not designed to make the number of branches larger to the extent that the characteristic impedance changes largely.

On the other hand, the situation after completing sending-out frames is considerably different from the above. For the sake of a comparative explanation, such a situation concerning the conventional technique will first be explained with reference to FIG. 4. The conventional technique corresponds to a structure where the timer circuit 53, switch driving circuit 55, switches S1 and S2, and resistors 56-59 are removed from the structure shown in FIG. 2.

Reflected waves, which are caused due to a change in the characteristic impedance, will return to the node after a time delayed due to transmission (for example, in the case of a copper wire, approx. 5 ns/m), as described. Hence, even when sending-out the frames are completed (finished), the return of reflected waves continues for a period of time corresponding to the time delayed due to transmission, from an instant time when the sending-out operation is completed.

Immediately after the time instant when the node (e.g., the node 100) sent out the frames, the node immediately changes its state for reception of data. And in such a period of time after completion of sending-out the frames, the node which sent out the frames (e.g., the node 100) becomes ready for receiving data. In this state, the output impedance of the transmission circuit 52b in the node becomes high, so that no canceling effect thanks to the transmission circuit 52b is provided for the reflected waves. As a result, reflected waves based on the theory for voltage reflection coefficient will appear on the communication lines of, for example, the branch line 30.

Figure 4:
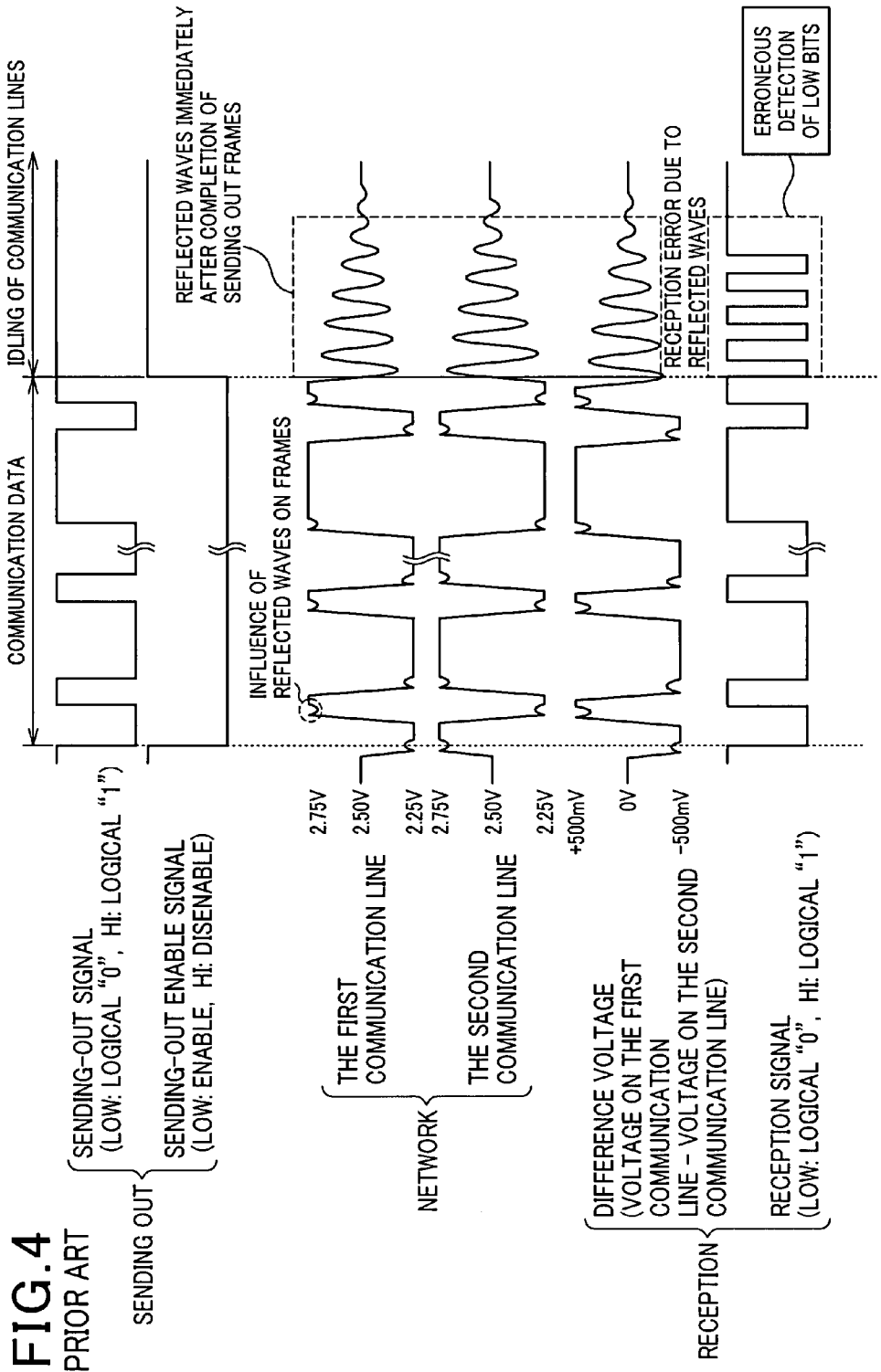
FIG. 4 is a timing chart showing a problem with which the conventional node is confronted

Accordingly, as illustrated in the third to sixth columns in FIG. 4, the reflected waves appear most largely in a period of time immediately after completion of sending-out frames. This means that even if a change in the characteristic impedance is relatively small on the communication lines, there is a possibility that other nodes receive erroneous frames of data. The erroneous frames of data are received as reception signals SR at an early stage in the idling period, in which the reception signals SR may be Low (LOW)-level corresponding to logical "0," even if the reception signals SR should be High (HI)-level during the idling period. If this happens, such nodes may receive false data which do not actually exist.

As described so far, when the transmission circuit 52b is in operation to send out frames of data, the communication lines of a branch line connected to the transmission circuit 52b are brought into a low impedance state. This is because the transmission circuit 52b is in operation. Hence an amount of reflected waves is reduced. In contrast, immediately after completion of sending out frames of data, the output impedance of the transmission circuit 52b becomes high, so that the communication lines connected to the transmission circuit 52b show a large amount of reflected waves remains on the lines.

However, the conventional technique has almost no power to reduce reflected waves occurring immediately after completion of a frame sending-out operation. This is because reflected waves will return before the last data finally reaches the branch point, and will come along the communication lines to collide with the last data which is still in transmission to the node on the communication lines.

Even if a design is made such that impedance matching resistors and capacitors are selected to have values focused on suppressing larger reflected waves caused immediately after completion of the frame sending-out operation, the suppression is traded off by a disadvantage. That is, the characteristic impedance during the frame sending-out operation becomes unmatched, thus increasing the reflected waves by contrast.

However, the foregoing conventional problem can be solved by the circuitry according to the present embodiment shown in FIG. 2.

In the node 100, only during the predetermined period of time T starting from a time when the transmission of a frame from the transmission circuit 52b in the receiver 52 to the branch line 30 has been completed, the switches S1 and S2 are turned on. This switching allows the first communication line 10 to connect to the connection point P1 between the resistors 56 and 57, and allows the second communication line 11 to connect to the connection point P2 between the resistors 58 and 59. These connections reduce the respective impedances to the first and second communication lines 10 and 11, and the respective potentials on the first and second communication lines 10 and 11 are stabilized to be the frame-non-output potential (=2.5 V) at the connection points P1 and P2.

The timer circuit 53, switch driving circuit 55, and switches S1 and S2 are formed such that an operational delay time, which is counted from the low-to-high transition of the sending-out enable signal SE to a time when the switches S1 and S2 are turned on, is shorter than a sending-out delay time from the transmission circuit 52b of the transceiver 52. The sending-out delay time can also be defined as a delay time lasting from changes in the level of the sending-out signal ST to changing the voltages on the first and second communication lines 10 and 11.

This formation of the operational delay time is set for turning on the switches S1 and S2 as quickly as possible, in cases where, in the last stage of transmission of frames (i.e. data to be communicated) the sending-out signal ST changes in the level from the low to the high (i.e., idling) and the sending-out enable signal SE changes in the level from the low to the high, as shown in the first and second columns in FIG. 3.

The foregoing predetermined period of time T, during which the switches S1 and S2 are made "on" without rest is decided in consideration of the size of the network and the actual duration of reflective waves. Practically, a reflected wave lasts for a period of t1 immediately after transmission of each frame, it is sufficient that the period of time T is set to a time which is slightly longer than the period t1. For example, the period t1 is approximately 700 ns, the foregoing predetermined period of time T is 1 μs.

Meanwhile the timer circuit 53 may be formed with digital circuits operating on clock signals or with analog type of time constant circuits that use resistors and capacitors. The switch driving circuit 55 may be formed to respond only the output from the timer circuit 53. Namely, during only a period of time making the output of the timer circuit 53 high without rest, the switches S1 and S2 are made to turn on.

In the communication system according to the first embodiment, assumption can be made such that, of the nodes 100-103, for example, one node 100 completes the transmission of a frame of data. In this case, during only a predetermined period of time T counted from the time instant at which the transmission of the frame is completed, the first and second communication lines 10 and 11, which compose the branch line 30 connected to the node 100, are electrically connected to the connection points P1 and P2 between the resistors 56 and 57 and between the resistors 58 and 59. Thus the impedances of the first and second communication lines 10 and 11 are reduced, whereby a reflected wave to be caused on the branch line 30 immediately after the node 100 sends out the frame can be suppressed with reliability.

In particular, in the present first embodiment, the design is made in such a way that a DC (direct current) stabilizing circuit composed of the switches S1 and S2 and the resistors 56-59 work for both the first and second communication circuits 10 and 11. Thus, as shown in FIG. 3, even if there is a reflected wave immediately after completion of sending out a frame, as shown in FIG. 3, the potential on the first communication line 10 can be stabilized to the frame-non-output potential (=2.5 V) at the connection point P1 as quickly as possible. The is true of the second communication line 11, the potential on the second communication line 11 can quickly be stabilized to the frame-non-output potential at the connection point P2.

It is therefore possible that the other nodes 101-105 are prevented from receiving an erroneous frame which is due to reflected waves. The degree of freedom for designing the length of transmission lines and the topology can be improved greatly.

In the present first embodiment, the timer circuit 53, switching driving circuit 55, switches S1 and S2, and resistors 56-59 compose impedance reducing means. Of these components, the resistors 56 and 57 compose first voltage dividing means and the resistors 58 and 59 compose second voltage dividing means.

By the way, if the first and second communication lines 10 and 11 are formed to cause reflected waves which are mutually asymmetric, the potentials at the connection points P1 and P2 may be set to amounts which are mutually different from each other. More concretely, depending on how much there is asymmetry in the reflected waves, the potentials at the connection points P1 and P2 are differentiated from each other, thus shortening a time for absorbing the reflected waves.

Second Embodiment

Figure 5:
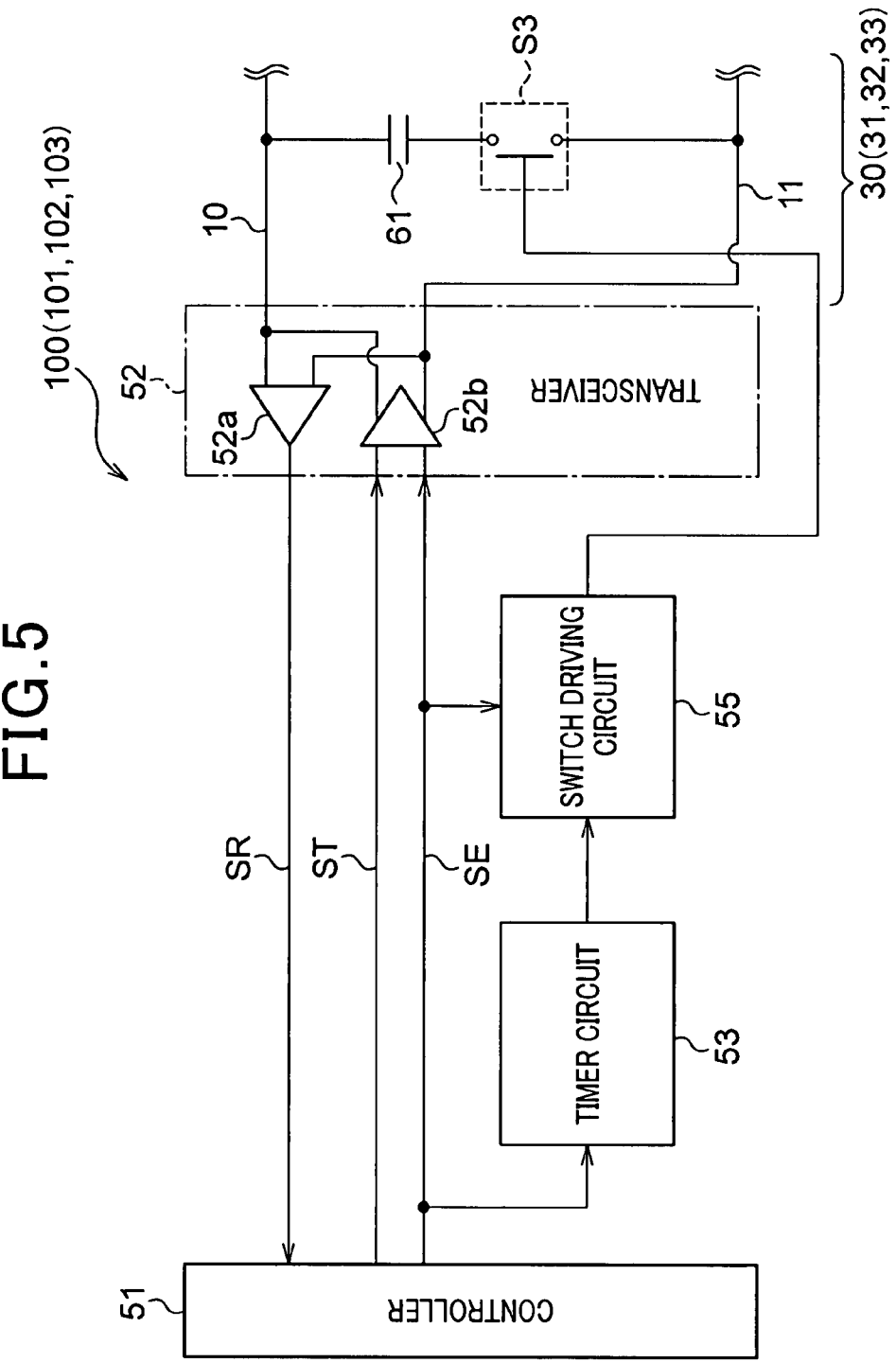
FIG. 5 is a configuration diagram, partly in blocks, showing communication-related components incorporated in one of nodes connected to a communication system according to a second embodiment of the present invention.
Figure 6:
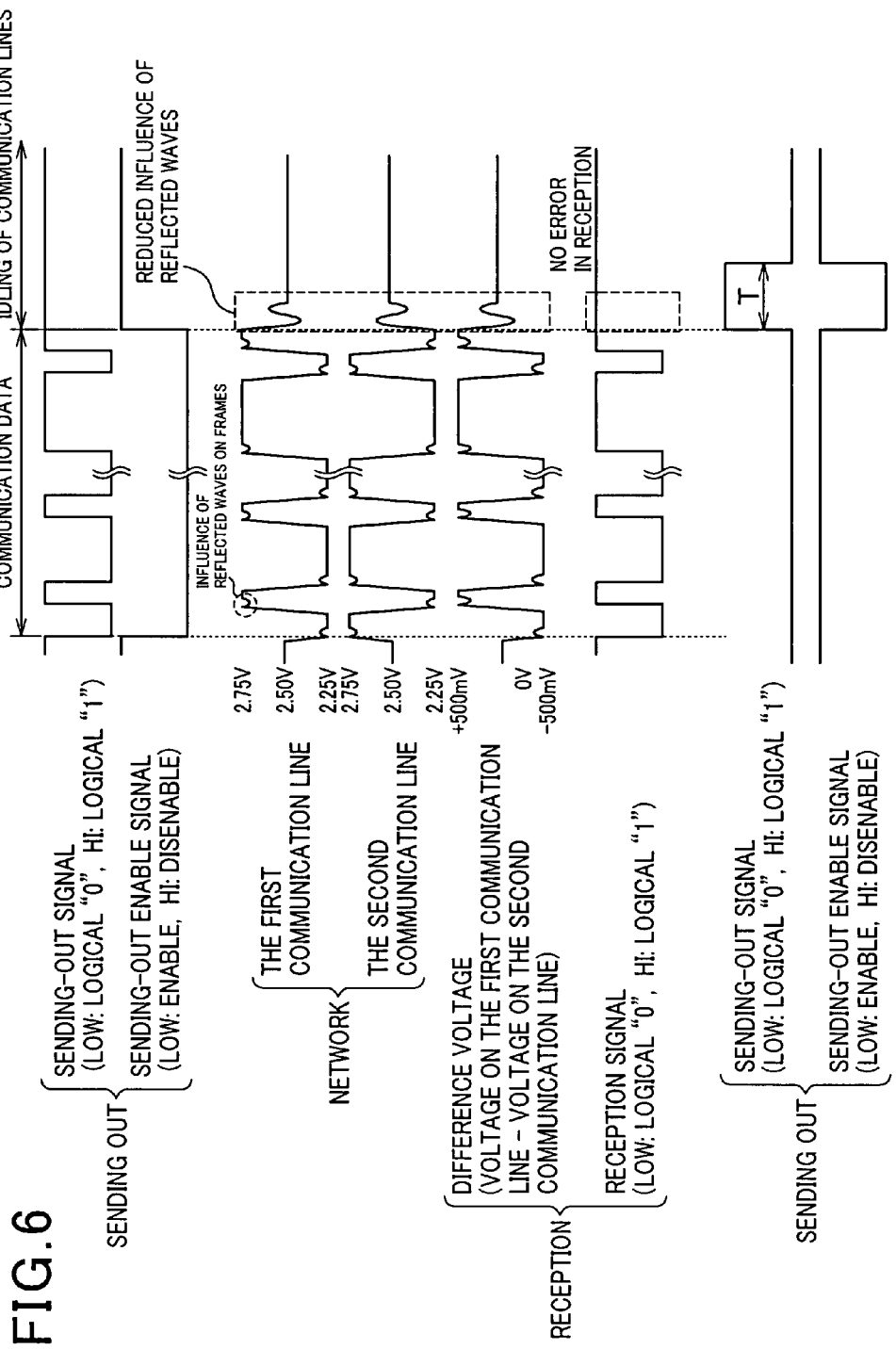
FIG. 6 is a timing chart showing operations and advantages performed and gained in the communication system according to the second embodiment.

Referring to FIGS. 5 and 6, a communication system according to a second embodiment of the present invention will now be described.

In the second embodiment, the same or similar components as or to those in the foregoing first embodiment will be given the same reference numerals for the sake of a simplified explanation.

The communication system described in the second embodiment is different from that of the first embodiment in communication-related sections of the nodes 100-103. The remaining sections are the same or similar to those described in the first embodiment. Further, the nodes 100-103 are formed to operate in the same way, so the node 100 will now be described as a representative.

As shown in FIG. 5, an electronic on/off switch S3 and a capacitor 61 are arranged in the node 100, instead of the switches S1, S2 and resistors 56-59 in FIG. 2 of the first embodiment.

The switch S3 and capacitor 61 are connected in series to each other between the first and second communication lines 10 and 11. When the switch S3 responds to a drive signal from the switch driving circuit 55 to be turned on, whereby the first and second communication lines 10 and 11 are electrically connected to each other through the capacitor 61.

Like the first embodiment, the switch driving circuit 55 responds to the sending-out enable signal SE. In other words, the switch S3 is turned on during a predetermined period of time T starting from a low-to-high transition of the sending-out enable signal SE to at a time when the output of the timer circuit 53 returns to its low level (refer to the second, seventh, and eighth columns in FIG. 6).

Thus, in the node 100, the switch S3 continues its on-state during only the predetermined period of time T lasting from at a time when sending out a frame (i.e., data to be transmitted) to the branch line 30 has been completed under the control of the transmission circuit 52b in the transceiver 52. Responsively to this, the capacitor 61 begins to be electrically interposed between the first and second communication lines 10 and 11 at that time when the switch S3 is turned on. This electrical connection reduces an impedance between the first and second communication lines 10 and 11.

In the communication system according to the second embodiment, the node 100 is able to send out a frame, for example. When the node 100 has competed the sending-out action of the frame, during only the predetermined period of time T from the completion time instant, the capacitor 61 electrically connects the first and second communication lines 10 and 11 belonging to the branch line 30 connected to the node 100. Thus the amount of an impedance between the first and second communication lines 10 and 11 is forced to be reduced. As shown in FIG. 6, this reduction in the impedance suppresses a reflected wave from being generated in the branch line 30 immediately after sending out the frame from the node 100.

In other words, because the reflected wave includes, as a main component, an AC (alternating current) signal component, the first and second communication lines 10 and 11 are made to connect with each other in terms of the AC signal. This electrical connection produces, on the first and second communication lines 10 and 11, reflected waves whose phases are opposite to each other. Thus the two reflected waves collide with each other to be canceled and then disappear.

Accordingly, like the first embodiment, the other nodes 101-105 are prevented from receiving frames which are erroneous due to the reflected wave. Thus the design for the length of transmission paths and the topology can be improved largely in its degree of freedom.

In the second embodiment, the timer circuit 53, switch driving circuit 55, switch S3 and capacitor 61 correspond to impedance reducing means.

In the circuitry shown in FIG. 5, the connected positions of the capacitor 61 and the switch S3 may be exchanged with each other.

Third Embodiment

Figure 7:
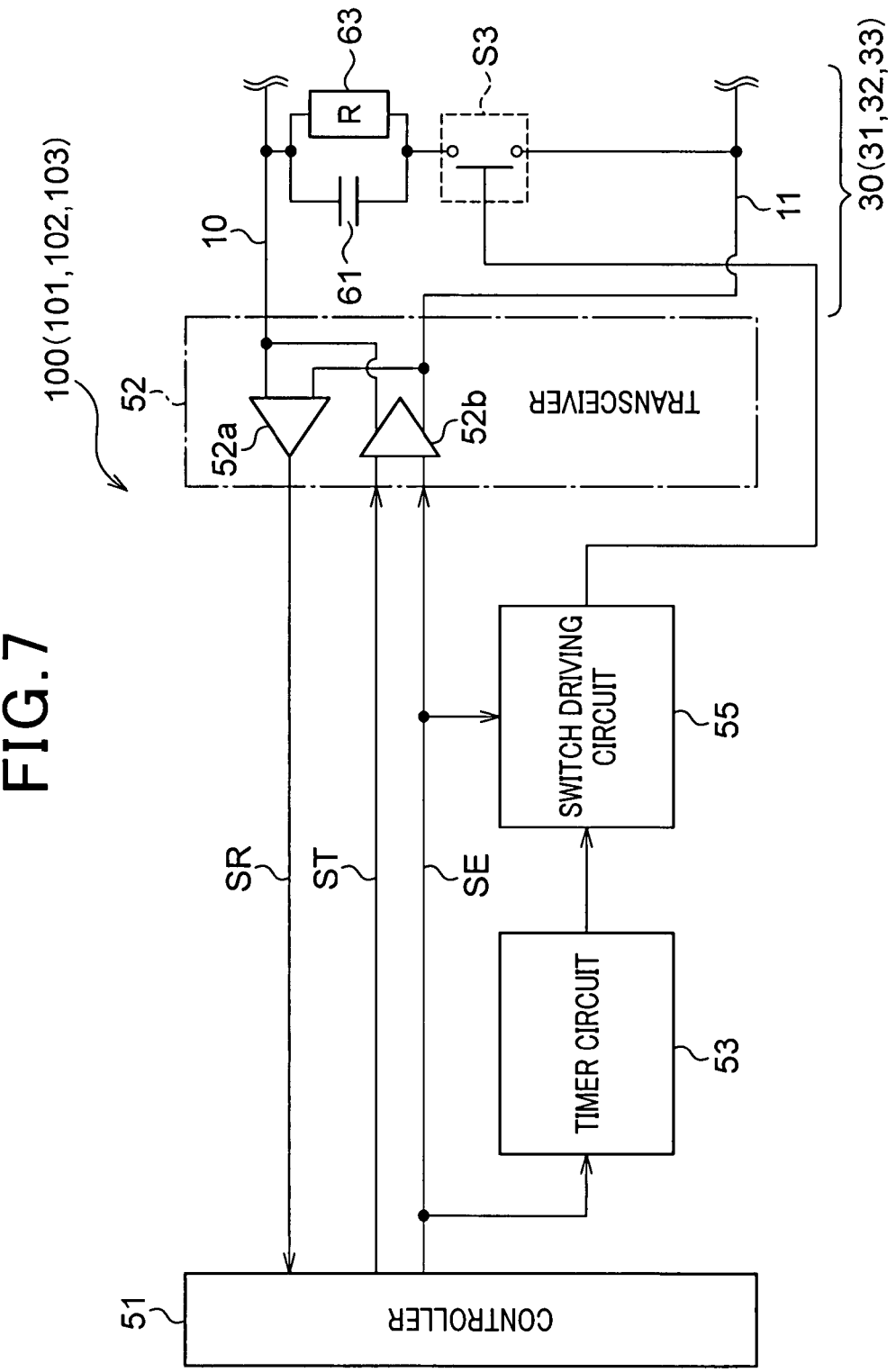
FIG. 7 is a configuration diagram, partly in blocks, showing communication-related components incorporated in one of nodes connected to a communication system according to a third embodiment of the present invention.

Referring to FIG. 7, a communication system according to a third embodiment of the present invention will now be described.

In this third embodiment, the same or similar components as or to those in the foregoing second embodiment will be given the same reference numerals for the sake of a simplified explanation.

Only the nodes 100-103 differ from those in the second embodiment. The node 100 will be described as a representative for those nodes 100-103.

As shown in FIG. 7, the node 100 is additionally provided with a resistor 63 to the configurations of the second embodiment shown in FIG. 5. The resistor 63 is electrically connected in parallel with the capacitor 61.

In the node 100, during the predetermined period of time T from completion of sending out frames to the branch line 30 under the control of the transmission circuit 52b of the transceiver 52, the switch S3 is in its on state. Hence, during this period T, the first and second communication lines 10 and 11 are mutually connected via the parallel circuit consisting of the capacitor 61 and the resistor 63. This connection also reduces the impedance between the first and second communication lines 10 and 11.

In the third embodiment, the capacitor 61 provides the communication system the operations and advantages identical to those in the second embodiment. An additional operation is that DC components included in reflected waves to be caused respectively on the first and second communication lines 10 and 11 also collide with each other via the resistor 63, thus canceling each other out, and disappearing. Accordingly, all the signal components (i.e., AC and DC components) to be caused on the first and second communication lines 10 and 11, which components are opposite in phase to each other, collide with each other in order to disappear, thus being more effective in the cancellation than that in the second embodiment.

In the third embodiment, the timer circuit 53, switch driving circuit 55, switch S3, capacitor 61, and resistor 63 compose impedance reducing means.

The configuration shown in FIG. 7, the parallel circuit consisting of the capacitor 61 and resistor 63 and the switch S3 may be switched from one the other as to the connection order.

Fourth Embodiment

Figure 8:
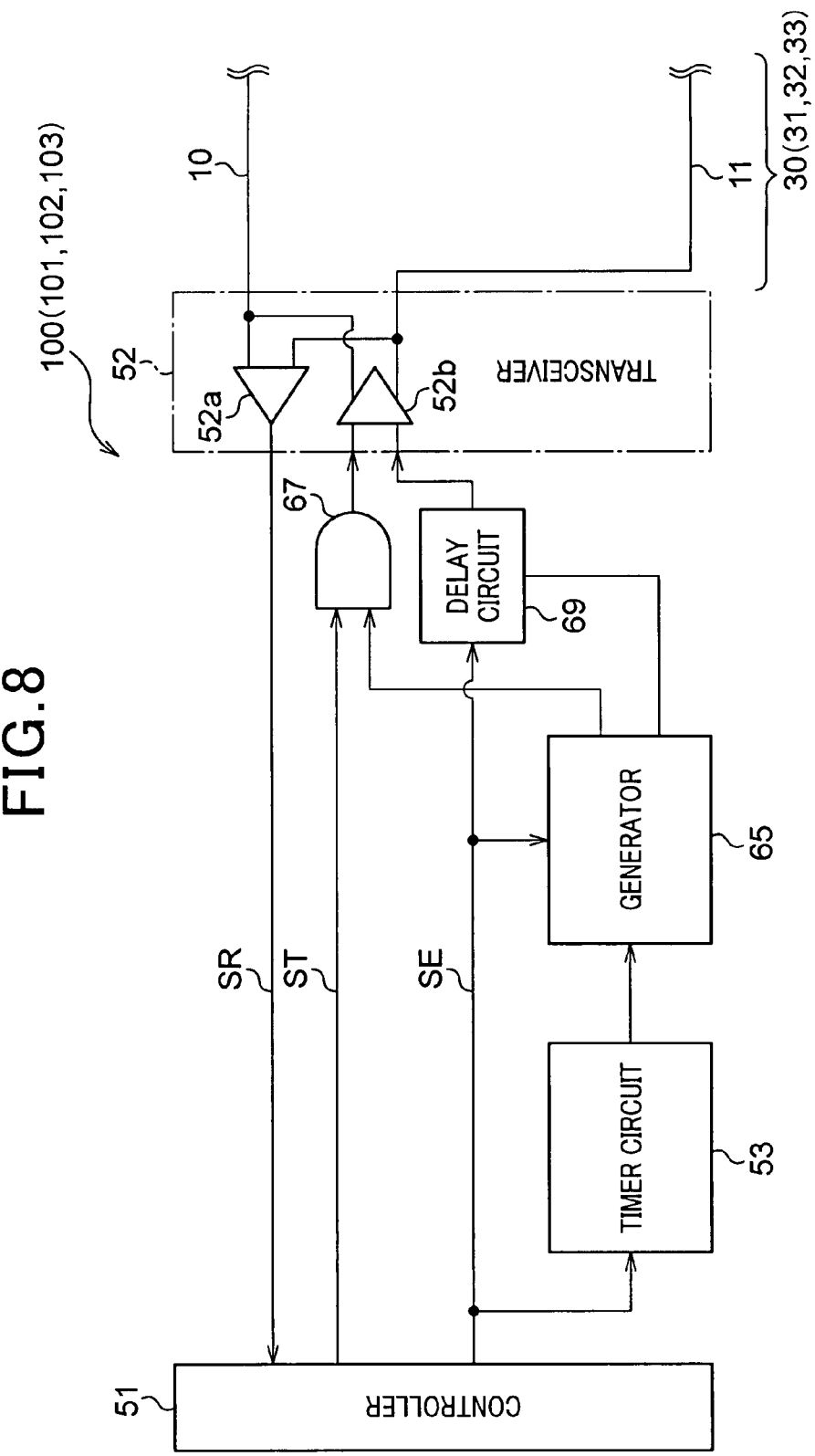
FIG. 8 is a configuration diagram, partly in blocks, showing communication-related components incorporated in one of the nodes connected to a communication system according to a fourth embodiment of the present invention.
Figure 9:
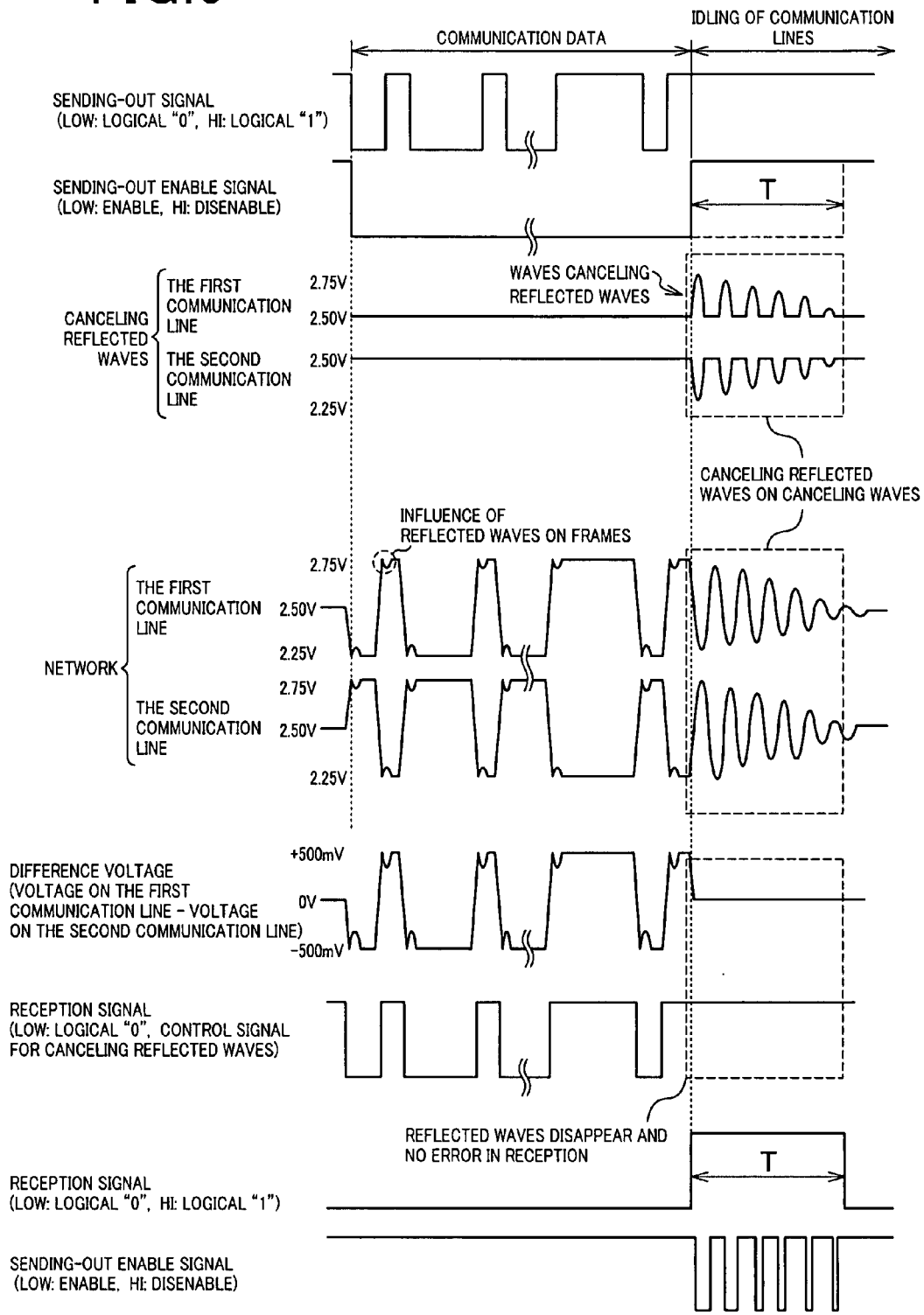
FIG. 9 is a timing chart showing operations and advantages performed and gained in the communication system according to the fourth embodiment.

Referring to FIGS. 8 and 9, a communication system according to a fourth embodiment of the present invention will now be described.

In this fourth embodiment, the same or similar components as or to those in the foregoing first embodiment will be given the same reference numerals for the sake of a simplified explanation.

Compared with the first embodiment, only the nodes 100-103 differ from those in the first embodiment. The node 100 will be described as a representative for those nodes 100-103.

As shown in FIG. 8, the node 100 is provided with a generator 65, an AND circuit 67, and a delay circuit 69, in place of the switch driving circuit 55, switches S1 and S2, and resistors 56-59 in FIG. 2 according to the first embodiment.

The generator 65 is formed to operate as shown in the second, ninth and tenth columns in FIG. 9. Specifically, the generator 65 operates to output a reflected-wave canceling control signal during only a predetermined period of time T. This period T is counted, as described already, from a time instant at which the sending-out enable signal SE changes in the level from Low to High, to a time instant at which the output of the timer circuit 53 is returned in the level to Low.

As illustrated in the third to sixth columns in FIG. 9, the reflected-wave canceling control signal is outputted to the transmission circuit 52b of the receiver 52. In response to this control signal, the transmission circuit 52b is configured to output two reflected-wave canceling signals to the first and second communication lines 10 and 11, respectively. The reflected-wave canceling signals are opposite in phase to each other and also opposite in phase to reflected waves returning along the lines 10 and 11, respectively.

In the present embodiment, the generator 65 is configured to continuously be active responsibly to only the High output from the timer circuit 53.

The AND circuit 67 is placed to receive the sending-out signal ST from the controller 51 and the canceling control signal from the generator 65 and performs logical AND operation on those signals. A signal outputted from the AND circuit 67 is sent to the transmission circuit 52b of the transceiver 52 as sending-out signals ST to be sent out actually through the lines 10 and 11.

In the present embodiment, as shown in the first and tenth columns in FIG. 9, the sending-out signal ST originated from the controller 51 keeps its High level when the lines idle and the reflected-wave canceling signal originated from the generator 65 keeps its High level then the generator 65 is not in active. Hence, the sending-out signal ST indicating data to be communicated, which is outputted from the controller 51, is sent to the transmission circuit 52b via the AND circuit 67. In addition, during the predetermined period of time T, the canceling control signal (corresponding to the reflected-wave canceling signal) from the generator 65 is sent to the transmission circuit 52b via the AND circuit 67.

The delay circuit 69 is placed to perform the operations shown by a dashed line in the second column in FIG. 9. That is, the delay circuit 69 delays the rise (from Low to High) of the sending-out enable signal SE from the controller 51 by a predetermined period of time T during which the generator 65 is active. Such a delayed sending-out enable signal SE is sent to the transmission circuit 52b of the transceiver 52.

Hence, like the various embodiments described so far, during a period of time in which the sending-out enable signal SE is Low in the level (i.e., a predetermined period of time for sending out frames), the transmission circuit 52b is able to change the potentials on the first and second communication lines 10 and 11 depending on the sending-out signal ST coming from the controller 51. It is therefore possible to send out data to be communicated, which takes the form of frames, to the first and second communication lines 10 and 11.

On completion of the sending-out operation for the frames, the transmission circuit 52b responds to a Low-to-High transition of the sending-out enable signal SE. During the predetermined period of time T starting from this transition time instant, the transmission circuit 52b responds to the canceling control signal from the generator 65 so as to change the potentials on the first and second communication lines 10 and 11. This action of changing potentials creates waves to cancel the reflected waves to send out those canceling waves along the first and second communication lines 10 and 11, respectively.

In the communication system according to the fourth embodiment, when the node 100 completes its sending-out operation for frames, the transmission circuit 52b of the node 100 sends out the reflected-wave canceling waves during only the predetermined period of time T starting from the completion of the frame sending-out operation. Thus, responsively to the reflected-wave canceling waves, the impedance on each of the first and second communication lines 10 and 11 composing the branch line 30 connected the node 100 becomes lower in the same way as the period for sending out frames. It is therefore possible to suppress reflected waves occurring on the branch line 30 immediately after the frames have been sent out in the same fashion in the foregoing various embodiments. In this way, the reflected-wave canceling waves are opposite in phase to reflected waves caused actually, resulting in that as shown in the seventh and eighth columns in FIG. 9, the reflected waves can be canceled well.

In addition, the present forth embodiment utilizes the transmission circuit 52b of the node 100 for reducing the potentials on the first and second communication lines 10 and 11. This is also useful in terms of reducing the number of elements and circuits to realize the commutation system according to this embodiment.

In the forth embodiment, the timer circuit 53, generator 65, AND circuit 67, and delay circuit 69 make up impedance reducing means.

A modification concerning how to operate the transmission circuit 52b can be provided. In the fourth embodiment, as shown in the third and fourth columns in FIG. 9, the transmission circuits 52 operates during the period of time T to change the potentials on the first and second communication lines 10 and 11 between 2.5 V and 2.75 V (for the first communication line 10) and between 2.5 V and 2.25 V (for the second communication line 11), respectively. These potential changes can be done by turning on/off transistors incorporated in the transmission circuit 52b. But this is not a decisive way to change the potentials. In the same way as the frame sending-out operation, the transmission circuit 52b can be formed to change the potentials on the first and second communication lines 10 and 11 between the 2.75 V and 2.25 V.

Fifth Embodiment

Figure 10:
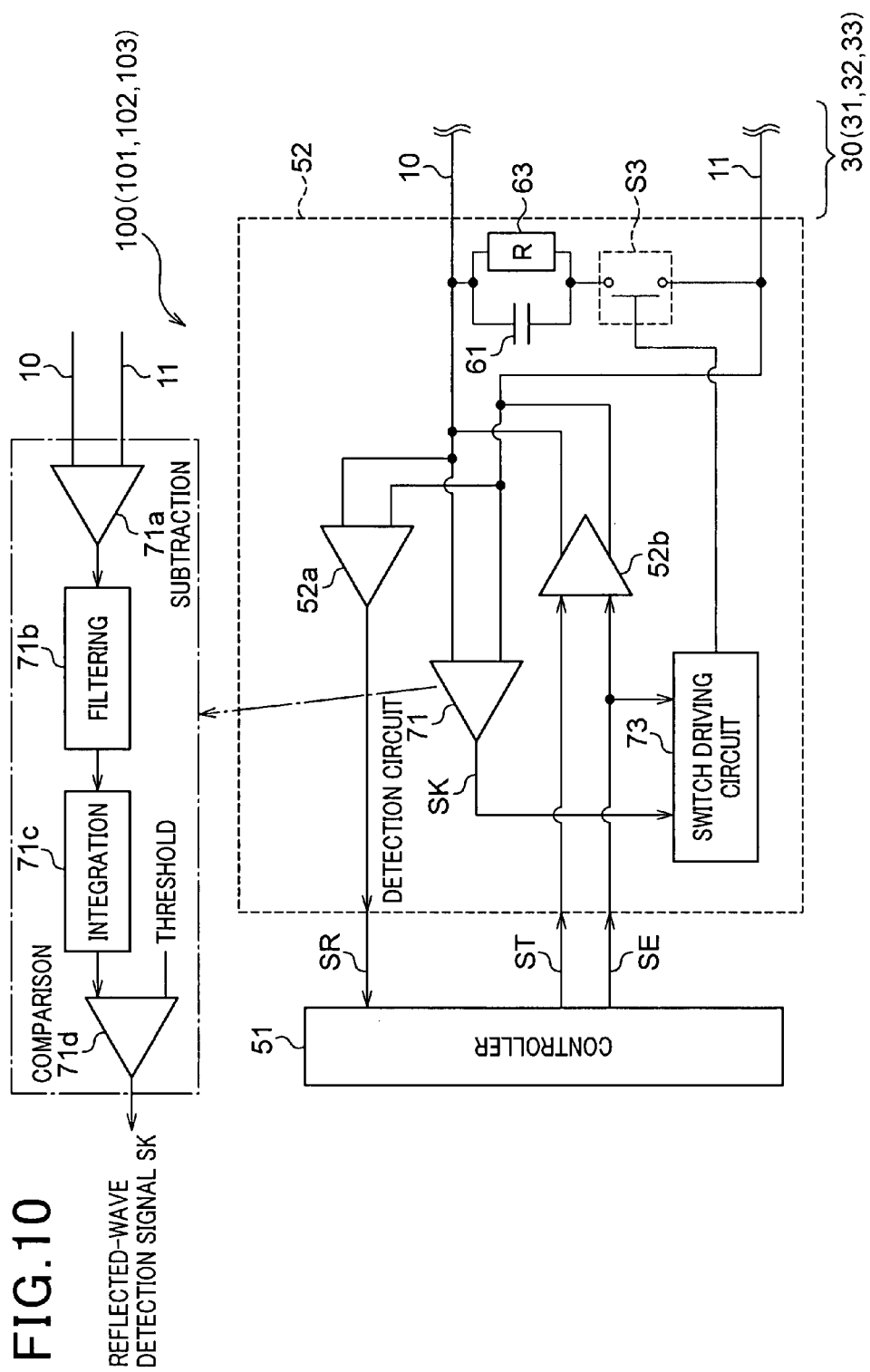
FIG. 10 is a configuration diagram, partly in blocks, showing communication-related components incorporated in one of nodes connected to a communication system according to a fifth embodiment of the present invention.
Figure 11:
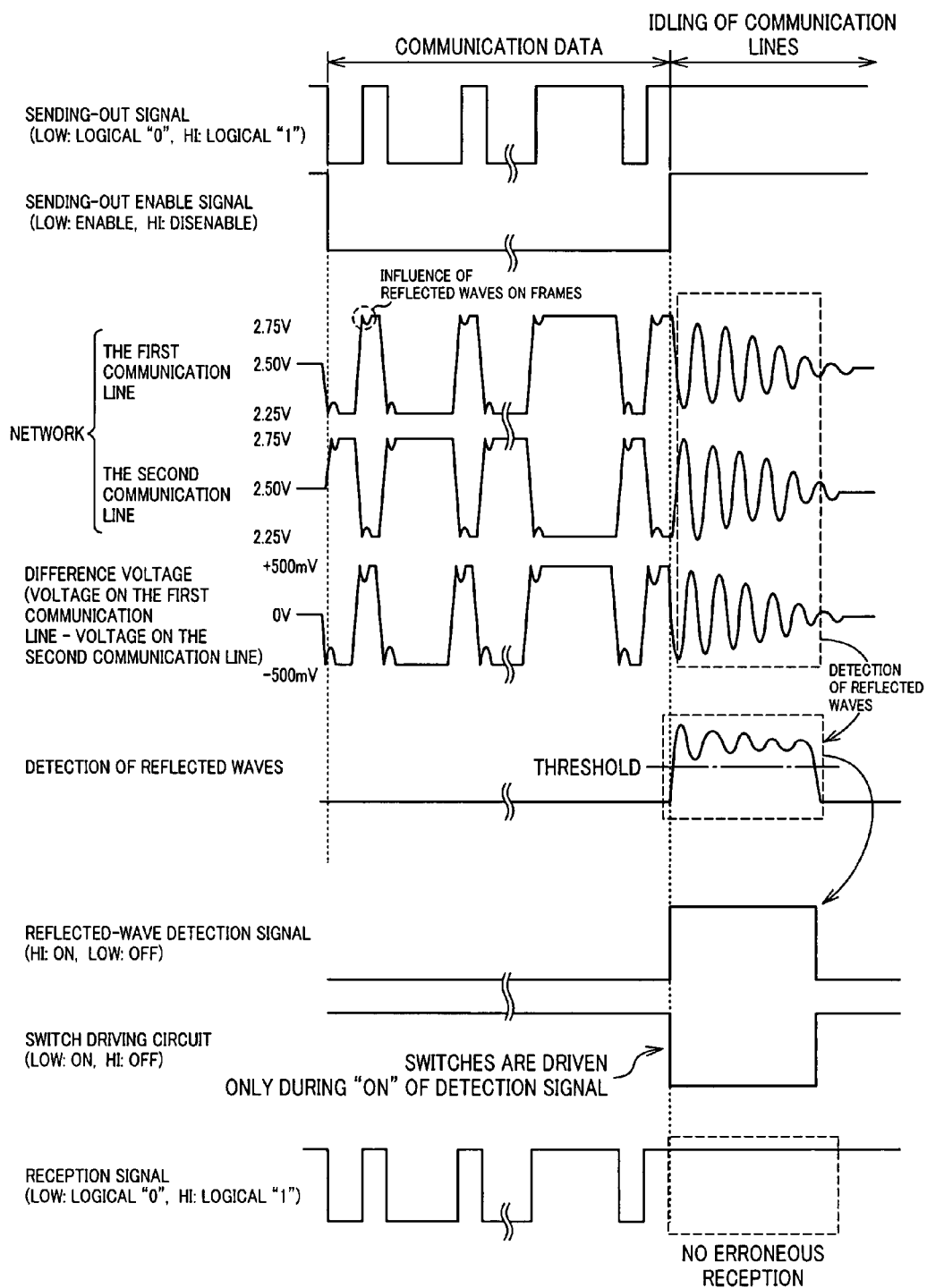
FIG. 11 is a timing chart showing operations and advantages performed and gained in the communication system according to the fifth embodiment.

Referring to FIGS. 10 and 11, a communication system according to a fifth embodiment of the present invention will now be described.

In this fifth embodiment, the same or similar components as or to those in the foregoing third embodiment will be given the same reference numerals for the sake of a simplified explanation.

Only the nodes 100-103 differ from those in the third embodiment. The node 100 will be described as a representative for those nodes 100-103.

The node 100 shown in FIG. 10 differs from the configuration shown in FIG. 7 (i.e., the third embodiment) in the following three points.

Firstly, in place of the timer circuit 53, there is placed a detecting circuit 71 to detect reflected waves on the branch line 30. This detecting circuit 71 comprises a difference circuit 71a, filter 71b, integrating circuit 71c, and comparator 71d.

Of these circuits, the difference circuit 71a is formed to output a difference voltage between the potentials on the first and second communication lines 10 and 11, as shown in the third to fifth columns in FIG. 11. This difference voltage is calculated by subtracting the voltage on the second communication line 11 from the voltage on the first communication line 10.

The filter 71b is a high-pass filter or a band-pass filter which receives an output signal of the difference circuit 71a and pass, of the output signal, only signal components of frequencies presumably set as being given by reflected waves.

The integrating circuit 71c integrates a filtered signal from the filter 71b to output a detection voltage corresponding to the reflected waves.

The comparator 71d operates as shown in the sixth and seventh columns in FIG. 11. Specifically, the reflected-wave detection voltage from the integrating circuit 71c is compared in magnitude with a threshold previously set, and when the reflected-wave detection voltage is greater than the threshold, the comparator 71d outputs a High-active signal serving the reflected-wave detection signal SK.

Secondly, instead of the switch driving circuit 55, a switch driving circuit 73 is placed. This switch driving circuit 73 responds to both the sending-out enable signal SE from the controller 51 and the reflected-wave detection signal SK from the detecting circuit 71. To be specific, as shown in the seventh and eighth columns in FIG. 11, the switch driving circuit 73 makes the switch S3 turn on during a period of time measured from a time instant at which the sending-out enable signal SE changes in the level to High, to a time instant at which the reflected-wave detection signal SK returns in the level to Low. That is, this period of time starts at a time instant when sending-out frames is just completed, and lasts during the detection of the frames at the detecting circuit 71.

Thirdly, the detecting circuit 71, switch driving circuit 73, switch S3, capacitor 61, resistor 63, reception circuit 52a, and the transmission circuit 52b are implemented in the transceiver 52 made up of a signal IC.

In the fifth embodiment which is constructed as above, of the nodes 100-103, for example, when the node 100 has completed the sending-out action of frames, the switch S3 is turned on and its on-state of the switch S3 lasts for a period of time starting from a sending-out completion time instant and continuing as long as the reflected waves are detected (i.e., this period lasts until the reflected waves disappear and are not detected any more). During the on-state of the switch S3, like the third embodiment, the parallel circuit composed of the capacitor 61 and the resistor 63 is electrically inserted between the first and second communication lines 10 and 11 composing the branch line 30 connected to the node 100 which has sent out the frames. Hence, in this fifth embodiment, reflected waves, which occur on the branch line 30 immediately after the node 100 has sent out the frames, can be suppressed without fail. Thus, as illustrated in the last column in FIG. 11, the other nodes 101-105 can be prevented from receiving erroneous frames due to the reflected waves.

In the fifth embodiment, an additional advantage can be obtained as follows. The switch S3 is actively turned on to suppress reflective waves by detecting the wave signals on the communication lines. In consequence, without paying much attention to various factors including the topology of a network and the time length of generation of reflected waves which depends on the number of branch lines, the reflected waves can be suppressed reliably.

In this fifth embodiment, the switch driving circuit 73, switch S3, capacitor 61, and resistor 63 compose impedance reducing means.

The present embodiment may be modified as follows. The switch driving circuit 73 may be formed such that this circuit 73 makes the switch S3 turn on when the sending-out enable signal SE and the reflected-wave detection signal SK are both in the High level. In such a configuration, even if reflected waves occur after a slight delay from completion of frame sending-out actions of a node, the switch S3 is made to turn on, so long as the occurring reflected waves are detected by the detecting circuit, leading to a sure suppression of the reflected waves.

Another modification can be applied to the fifth embodiment as well as its modification described above. That is, the resistor 63 may be removed from the configuration in FIG. 10. In this case, the first and second communication lines 10 and 11 are electrically connected through only the capacitor 61, when the switch S3 is made on, like the configuration in FIG. 5. Still alternatively, in the configuration in FIG. 10, the switch S3, capacitor 61, and resistor 63 may be replaced by the switches S1, S2 and the resistors 56-59 described in connection with FIG. 2.

Sixth Embodiment

Figure 12:
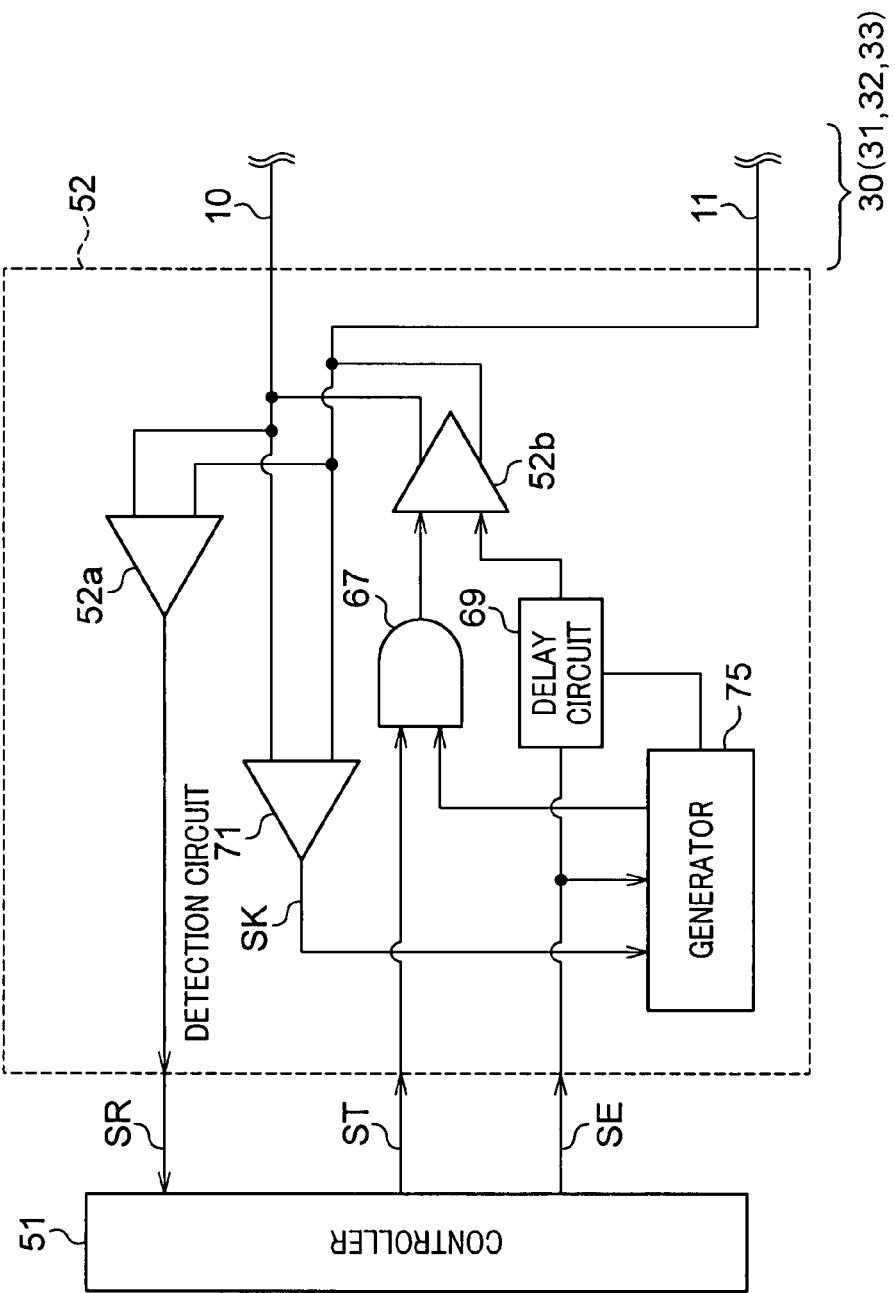
FIG. 12 is a configuration diagram, partly in blocks, showing communication-related components incorporated in one of the nodes connected to a communication system according to a sixth embodiment of the present invention.
Figure 13:
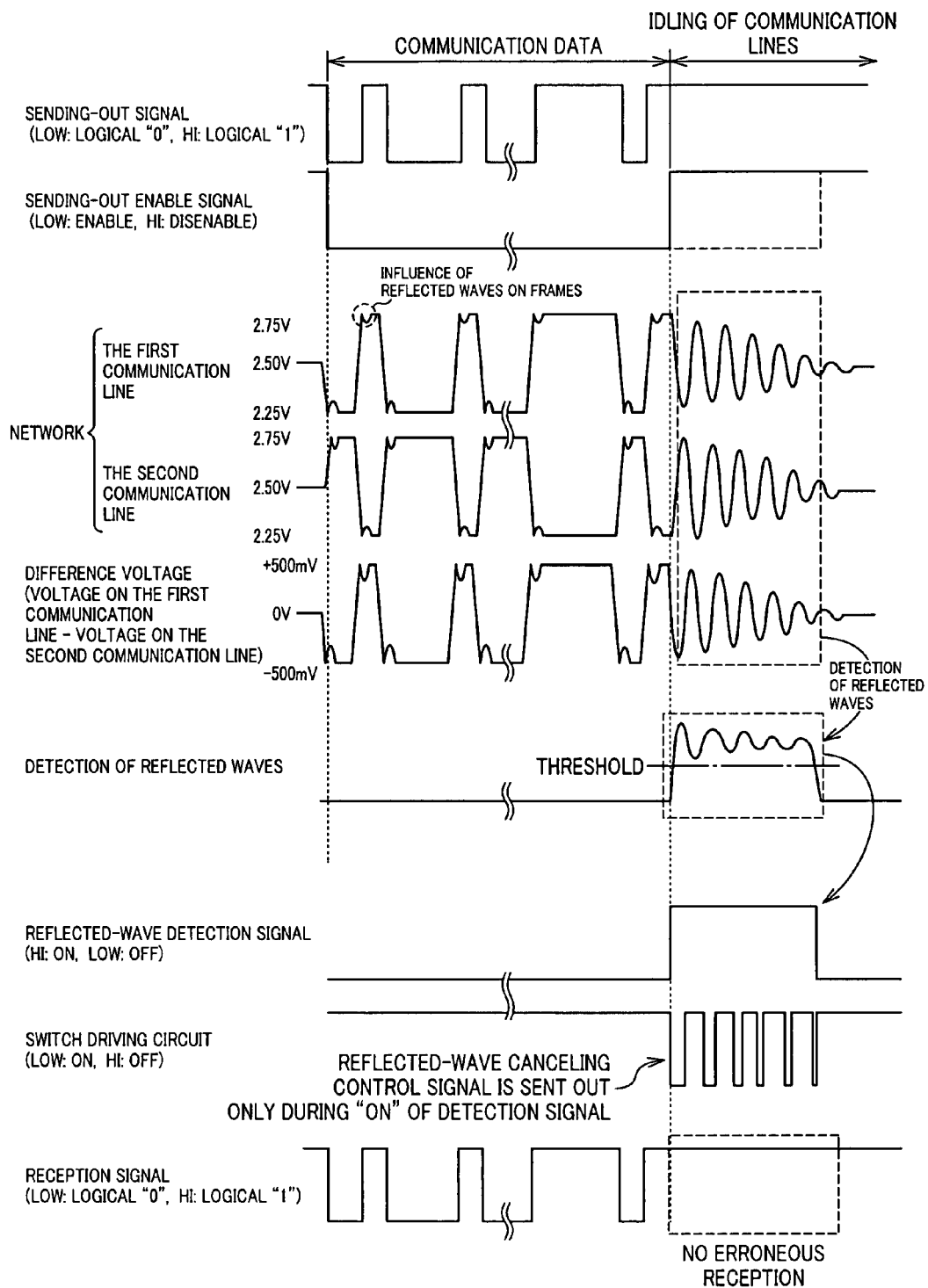
FIG. 13 is a timing chart showing operations and advantages performed and gained in the communication system according to the sixth embodiment.
Figure 14:
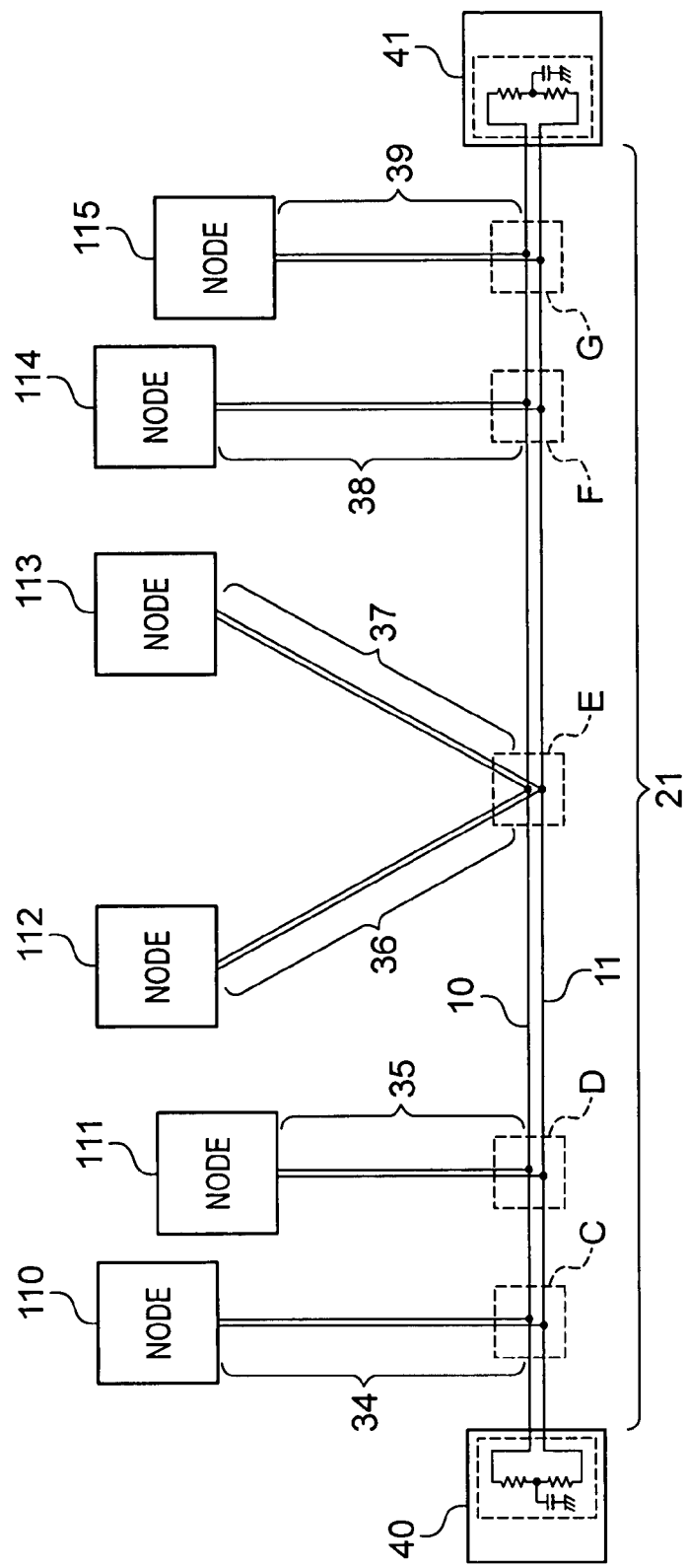
FIG. 14 is a configuration diagram showing a communication network according to another example.

Referring to FIGS. 12 and 13, a communication system according to a sixth embodiment of the present invention will now be described.

In this sixth embodiment, the same or similar components as or to those in the foregoing fourth embodiment will be given the same reference numerals for the sake of a simplified explanation.

Only the nodes 100-103 differ from those in the fourth embodiment. The node 100 will be described as a representative for those nodes 100-103.

As shown in FIG. 12, the node 100 is configured to have the following features, which are based on differences from the configuration shown in FIG. 8 (i.e., the fourth embodiment).

A first difference is that the timer circuit 53 in FIG. 8 is replaced by the detecting circuit 71 descried in the fifth embodiment. A second difference is to employ another type of generator 75 to generate a reflected-wave canceling control signal, in place of the generator 65. Specifically, the generator 76 operates as explained in the second, seventh, and eighth columns in FIG. 13, in which this generator 75 becomes active so as to the foregoing reflected-wave canceling control signal to the AND circuit 67 during only a period of time from a Low-to-High transition of the sending-out enable signal SE to a High-to-Low transition of the reflected-wave detection signal SK. That is, during this period of time staring at a time instant when the sending-out action of frames has been completed, the reflected waves are detected by the detecting circuit 71.

Hence, in cases where when the controller 51 outputs a sending-out signal ST indicative of data to be communicated, the signal ST is sent to the transmission circuit 52b via the AND circuit 67. Meanwhile, during a period of time during which reflected waves are detected by the detecting circuit 71, which is started to count in response to completion of sending out frames, the reflected-wave canceling control signal from the generator 71 is sent to the transmission circuit 52b via the AND circuit 67.

In this communication system, the delay circuit 69 is placed to have the operation shown by a dashed line in the second column in FIG. 13. That is, the sending-out enable signal SE is delayed from rising by a period of time during which reflected waves are detected continuously. The delayed sending-out enable signal SE is thus sent to the transmission circuit 52b.

Thirdly, the detecting circuit 71, generator 75, AND circuit 67, and delay circuit 69 are implemented, together with the reception circuit 52a and the transmission circuit 52b, in the same transceiver 52 made up of a single IC.

In the communication system of this embodiment, when the node 100 has completed its frame sending-out actions, the canceling operations for reflected waves are performed during a period of time during which the reflected waves are continuously detected, similarly to the canceling action in the fourth embodiment. Accordingly, the reflected waves, which occur immediately on the branch line 30 after the frames are sent out by the node 100, can be suppressed. As can be illustrated in the last column in FIG. 13, the other nodes 101-105 can be avoided from receiving erroneous data due to the reflected waves.

Like the fifth embodiment, the present sixth embodiment thus provides the communication system capable of sending out the waves canceling the reflection waves through active actions of the transmission circuit 52b, which actions are reflected by the signals on the network. Thus the identical or similar advantages to those in the fifth embodiment can be given.

In the sixth embodiment, the generator 75, AND circuit 67, and delay circuit 69 compose impedance reducing means.

The present embodiment can be modified into another configuration, in which the generator 75 becomes active when both the sending-out enable signal SE and the reflected-wave detection signal SK are High in the level and the delay circuit 69 makes the sending-out enable signal active (i.e., Low) while the reflected-wave canceling control signal is outputted from the generator 75. In this configuration, even if reflected waves occur with a slight delay after a node completed its sending-out operation for frames, the transmission circuit 52b can be operated to cancel the reflected waves, as long as the reflected waves are detected by the detecting circuit 71.

In the above, the various types of embodiments and modifications according to the present invention have been described, but the present invention is not limited to those embodiments and modifications. Without departing from the gist of the present invention, further modifications are possible as a matter of course.

For example, in the first to fourth embodiments, part or all of the circuits composing the impedance reducing means can be arranged outside each node, not limited to the inside of each node. Further, those circuits may be partly or entirely implemented within the transceiver 52 of each node.

In the similar way, in the fifth and sixth embodiments, part or all of both the circuits composing the impedance reducing means and the detecting circuit 71 can be arranged outside each node, not limited to the inside thereof. Further, those circuits may be partly or entirely implemented separately from the transceiver 52 in each node.

Moreover, the circuits corresponding to the impedance reducing means in the first to fourth embodiments or the circuits corresponding to both the impedance reducing means in the fifth and sixth embodiments and the detecting circuit 71 may be added to each of the nodes 104 and 105 (with termination circuits) connected to both ends of the main line 20, not limited to the nodes 100-103 respectively connected to branch lines 30-33. The nodes 104 and 105 are provided with the termination circuits 40 and 41 respectively, so that it is considered that a degree at which reflected waves occur is lower when each node 104 (105) sends out frames. Even if so, reflected waves, if they occur, can be suppressed effectively, when the foregoing suppressing circuits are provided in each node 104 (105).

The network, in which the communication system according to the present invention is implemented, will not also be limited to that shown in FIG. 1, but may be formed for example as shown in FIG. 13. The network shown in FIG. 13 is provided with a main liner 21 and branch lines 34-39. The main line 21 has branch points C, D, E, F and G from which the branch lines 34, 35, 36 and 37, 38, and 39 are branched respectively. Nodes 110-115 are connected to the branch lines 34-39 respectively. Both ends of the main line 21 are terminated by the termination circuits 40 and 41, respectively, not by nodes with termination circuits.

Another modification is concerned with the first to fourth embodiments in each of which the foregoing period of time T may be changed dynamically with changes in various factors such as temperature.

Still, the fifth and sixth embodiments may be modified such that the reception circuit 52a has the functions realized by the detecting circuit 71, although the reception circuit 52a and the detecting circuit 71 are provided separately from each other in the fifth and sixth embodiments. An example is that the reception circuit 52a is added by the filter 71b, integrating circuit 71c and comparator 71d shown in FIG. 9, because the reception circuit 52a has already a differential circuit functionally similar to the differential circuit 71a shown in FIG. 9. In other words, the reception circuit 52a and the detecting circuit 71 may be designed to use some circuits in common.

The communication system according to the present invention may be for use in other applications other than the vehicles.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A communication system comprising:
a network comprising a main line and a plurality of branch lines branched from the main line respectively, the main line and each of the branch lines being respectively formed into a differential two-wire communication line including a first communication line and a second communication line;
a plurality of nodes connected to two or more of the branch lines to communicate frames of data among the branches with each other; and
a reducer being arranged to at least one of the nodes and reducing either an impedance of each of the first and second communication lines or an impedance between the first and second communication lines during a specified period of time starting at a time instant when one of the plurality of node completes sending out frames of data to be transmitted, the first and second communication lines subjected to the reduction in the impedance being one of the plurality of branch lines connected to the node which sends out the frames of data,
wherein the reducer comprises
a first voltage dividing circuit and a second voltage dividing circuit each of which comprises a plurality of connected resistors having a connection point therebetween,
wherein the first and second voltage dividing circuits receive a predetermined voltage and produce a predetermined divided potential at each connection point and the first and second communication lines are connected to the connection point of each of the first and second voltage dividing circuits, respectively; and
a controller has first means for selectively connecting and disconnecting the first communication line and the connection point of the first voltage dividing circuit and second means for selectively connecting and disconnecting the second communication line and the connection point of the second voltage dividing circuit,
wherein the first and second means are configured to connect the first and second communication lines and the connection points of the first and second voltage dividing circuits, respectively, when the node completes sending out frames of data to be transmitted.

2. The communication system according to claim 1, wherein the specified period of time is set to a predetermined fixed period of time starting at the time instant.

3. The communication system according to claim 1, wherein at least one of the plurality of nodes comprises
a detector detecting a reflected wave occurring on one of the plurality of branch lines, connected to the node comprising the detector, the reflected wave being caused in response to the frames of data,
wherein the specified period of time is set to a period of time during which the detector continuously detects the reflected wave.

4. The communication system according to claim 1, wherein the predetermined divided potential at the connection point of each of the first and second voltage dividing circuits is set to a potential for idling the first and second communication lines.

5. The communication system according to claim 1, wherein the predetermined divided potentials at the connection points of the first and second communication lines are different from each other.

6. The communication system according to claim 1, wherein
the reducer comprises
a connecting circuit including a capacitive element; and
a controller having means for connecting the first and second communication lines to each other via the connecting circuit between the connected first and second communication lines belonging to one of the plurality of branch lines when a connected node completes sending out the frames of data to be transmitted.

7. The communication system according to claim 6, wherein the connecting circuit includes a capacitor.

8. The communication system according to claim 6, wherein
the connecting circuit includes a capacitor and a resistor electrically connected in parallel to each other.

9. The communication system according to claim 8, wherein the node comprises
a detector detecting a reflected wave occurring on the branch line connected to the node including the detector, the reflected wave being caused in response to the frames of data,
wherein the specified period of time is set to a period of time during which the detector continuously detects the reflected wave.

10. The communication system according to claim 1, wherein the node comprises
a transmission circuit sending out frames of data to the first and second communication lines of a branch line, the transmission circuit also serving as the reducer; and
a detector detecting a reflected wave occurring on the branch line connected to a node including the detector, the reflected wave being caused in response to the frames of data,
wherein the specified period of time is set to a period of time during which the detector continuously detects the reflected wave and the transmission circuit is driven to be served as the reducer during the specified period of time.

11. The communication system according to claim 1, wherein the main line is connected to a node with a termination circuit that terminates the main line, the node connected to the main line communicating the frames of data with the nodes connected to the branch lines.

12. The communication system according to claim 11, wherein the node connected to the main line is provided with the reducer.

13. The communication system according to claim 1, wherein the reducer is incorporated in the node.

14. The communication system according to claim 13, wherein each of the nodes includes an electronic control unit having circuitry for performing the communication and for functioning as the reducer.

15. The communication system according to claim 1, wherein each of the plurality of nodes is equipped with the reducer.

16. The communication system according to claim 1, wherein the node is configured to send out the frame of data to both the first and second communication lines, the frame of data being opposite in phase to each other between the first and second communication lines.

17. The communication system according to claim 16, wherein the reducer is provided with means for canceling reflected waves occurring on the first and second communication lines of the branch line connected to the reducer, by sending out canceling waves to the first and second communication lines, the canceling waves to the first and second communication lines being opposite in phase to each other.

18. A node for a network comprising a main line and a plurality of branch lines branched from the main line respectively, the main line and each of the branch lines being respectively formed into a differential two-wire type of communication line including a first communication line and a second communication line, the node being connected with each of at least two of the branch lines,
the node comprising:
a circuit to communicate frames of data between the branches with each other; and
a reducer reducing either an impedance of each of the first and second communication lines or an impedance between the first and second communication lines during a specified period of time starting at a time instant when the circuit completes sending out frames of data to be transmitted, the first and second communication lines subjected to the reduction in the impedance including the branch line connected to the node which sends out the frames of data,
wherein the reducer comprises
a first voltage dividing circuit and a second voltage dividing circuit each of which comprises a plurality of connected resistors having a connection point therebetween,
wherein the first and second voltage dividing circuits receive a predetermined voltage and produce a predetermined divided potential at each connection point and the first and second communication lines are connected to the connection point of each of the first and second voltage dividing circuits, respectively; and
a controller has first means for selectively connecting and disconnecting the first communication line and the connection point of the first voltage dividing circuit and second means for selectively connecting and disconnecting the second communication line and the connection point of the second voltage dividing circuit,
wherein the first and second means are configured to connect the first and second communication lines and the connection points of the first and second voltage dividing circuits, respectively, when the node completes sending out frames of data to be transmitted.

* * * * *